(12) United States Patent
Yoyasu et al.

(10) Patent No.: US 10,533,588 B2
(45) Date of Patent: Jan. 14, 2020

(54) FASTENER

(71) Applicant: FALTEC Co., Ltd., Kawasaki-shi (JP)

(72) Inventors: Masae Yoyasu, Kawasaki (JP); Yusuke Kozuki, Kawasaki (JP)

(73) Assignee: FALTEC Co., Ltd., Kawasaki-Shi (JP)

( * ) Notice: Subject to any disclaimer, the term of this patent is extended or adjusted under 35 U.S.C. 154(b) by 133 days.

(21) Appl. No.: 15/701,823

(22) Filed: Sep. 12, 2017

(65) Prior Publication Data

US 2019/0078596 A1   Mar. 14, 2019

(51) Int. Cl.
*F16B 37/04* (2006.01)
*F16B 2/22* (2006.01)
*B62D 25/16* (2006.01)

(52) U.S. Cl.
CPC .............. *F16B 2/22* (2013.01); *B62D 25/163* (2013.01)

(58) Field of Classification Search
CPC ......... F16B 2/241; F16B 2/245; B62D 25/163
USPC ................... 411/174, 172, 175, 166, 970
See application file for complete search history.

(56) References Cited

U.S. PATENT DOCUMENTS

| | | | |
|---|---|---|---|
| 2,115,312 A | 4/1938 | Lombard | |
| 2,346,200 A | 4/1944 | Tinnerman | |
| 2,511,801 A * | 6/1950 | Churchill | F16B 2/245 248/71 |
| 3,276,800 A * | 10/1966 | Loudon | F16L 3/24 248/228.7 |
| 3,358,729 A * | 12/1967 | Munse | F16B 37/041 411/175 |
| 3,431,607 A * | 3/1969 | Tinnerman | F16B 2/245 24/346 |
| 3,669,170 A * | 6/1972 | Schuster | F16B 37/041 411/175 |
| 4,408,939 A * | 10/1983 | Graff | F16B 37/041 411/112 |
| 4,505,010 A | 3/1985 | Arenhold | |
| 4,724,585 A * | 2/1988 | Whitman | B60R 13/04 24/195 |
| 4,728,235 A | 3/1988 | Patti | |

(Continued)

FOREIGN PATENT DOCUMENTS

EP   0326481 A1   8/1989
GB   1236361 A    6/1971
(Continued)

OTHER PUBLICATIONS

Japanese Office Action dated Oct. 30, 2018 for Application No. 2016-128860.

(Continued)

*Primary Examiner* — Gary W Estremsky
(74) *Attorney, Agent, or Firm* — Moser Toboada (57) ABSTRACT

The fastener includes: a first facing portion and a second facing portion disposed so as to face each other, ends of the first and second facing portions being connected through a curved portion; a screw-fixing portion provided in at least one of the first and second facing portions and allowing a screw to be fixed thereto; and a rotation-preventing protrusion provided in one of the first and second facing portions and protruding therefrom in a direction from the one toward the other of the first and second facing portions, the rotation-preventing protrusion being disposed in an area next to the screw-fixing portion opposite to the curved portion.

8 Claims, 4 Drawing Sheets

(56) References Cited

U.S. PATENT DOCUMENTS

| | | | | |
|---|---|---|---|---|
| 4,883,397 A | * | 11/1989 | Dubost | F16B 2/245 |
| | | | | 411/174 |
| 5,338,138 A | * | 8/1994 | Pavur | F16B 37/041 |
| | | | | 403/397 |
| 2005/0036851 A1 | * | 2/2005 | Dang | E03B 7/095 |
| | | | | 411/175 |

FOREIGN PATENT DOCUMENTS

| | | |
|---|---|---|
| JP | U-S-58-106608 | 7/1983 |
| JP | H-05096527 U | 12/1993 |
| JP | 2001182730 A | 7/2001 |
| JP | 2002308150 A | 10/2002 |
| JP | 2009144789 A | 7/2009 |

OTHER PUBLICATIONS

Extended European Search Report dated Mar. 5, 2018 for Application No. 17190497.2.
Notice of Allowance dated Feb. 5, 2019 for Japanese Application No. 2016-128860.

\* cited by examiner

FASTENER

FIELD OF THE INVENTION

The present invention relates to a fastener.

BACKGROUND

For example, in order to fix an exterior component such as a mudguard to a bumper of a vehicle, the fastening using a fastener such as a J-nut is adopted. Such a fastener includes a first facing portion and a second facing portion disposed so as to face each other, ends of the first and second facing portions are connected through a curved portion, and the fastener is fixed to the bumper in a state where a flange of the bumper is held between the first and second facing portions. Japanese Unexamined Patent Application, First Publication No. 2002-308150 (hereinafter, referred to as Patent Document 1) discloses a fastener having an approximately S-shape similar to a J-nut.

The above-described fastener has a structure in which a screw (bolt, tapping screw or the like) penetrating through the first and second facing portions is tightened, the separation between the first and second facing portions is decreased, and thus the flange or the like extending from the main body of the bumper is held between the first and second facing portions. In general, the flange or the like of the bumper is provided with a hole into which a bolt is inserted, a recess in which the fastener is accommodated, or the like, in order to prevent a change of the positional relationship between the fastener and the flange or the like of the bumper at the time the fastener is fixed to the flange or the like of the bumper.

However, in recent years, in order to improve vehicle design, formability of the bumper (releasability of the bumper from the forming mold), or the like, the length of the flange or the like extending from the main body of the bumper has tended to be decreased. In this case, it may be difficult to provide the flange or the like extending from the main body of the bumper with an area for forming a hole into which a screw is inserted, a recess in which the fastener is accommodated, or the like as described above. Thus, when the screw penetrating through the first and second facing portions is tightened, the fastener may easily move relative to the flange or the like extending from the main body of the bumper in the rotation direction of the screw.

The fastener of Patent Document 1 includes a contact portion (refer to the reference sign 5a of Patent Document 1) that contacts a surface of the bumper. In a case where the contact portion contacts the surface of the bumper, when the screw penetrating through the first and second facing portions is tightened, it is possible to limit a change of the positional relationship between the fastener and the flange or the like extending from the main body of the bumper. However, in the fastener of Patent Document 1, if the flange does not protrude from the surface of the bumper in the perpendicular direction to the surface, the contact surface cannot contact the surface of the bumper. Accordingly, if the bumper does not have specific shapes, it is difficult to limit a change of the positional relationship between the fastener and the flange or the like extending from the main body of the bumper, and the versatility of the fastener of Patent Document 1 is low.

The present invention is made in view of the above problems, and an object thereof is to limit a fastener from moving relative to an attachment support (for example, a bumper) during attachment work without depending on the shape or the like of the attachment support and to reliably fix an attachment component (for example, a mudguard) to the attachment support.

SUMMARY

The present invention adopts the following configurations as means for solving the above problems.

A first aspect of the present invention is a fastener including: a first facing portion and a second facing portion disposed so as to face each other, ends of the first and second facing portions being connected through a curved portion; a screw-fixing portion provided in at least one of the first and second facing portions and allowing a screw to be fixed thereto; and a rotation-preventing protrusion provided in one of the first and second facing portions and protruding therefrom in a direction from the one toward the other of the first and second facing portions, the rotation-preventing protrusion being disposed in an area next to the screw-fixing portion opposite to the curved portion.

A second aspect of the present invention is that in the fastener of the first aspect, rotation-preventing protrusions are provided so as to be separated from each other at a distance greater than a width of the other of the first and second facing portions not provided with the rotation-preventing protrusions.

A third aspect of the present invention is the fastener of the first or second aspect including: a resilient portion provided in at least one of the first and second facing portions and being resiliently deformable in a separation direction from the other toward the one of the first and second facing portions.

A fourth aspect of the present invention is that in the fastener of the third aspect, the resilient portion includes: a root portion resiliently deformable in the separation direction; a protrusion portion disposed in an area next to the root portion opposite to the screw-fixing portion and protruding inward of a space between the first and second facing portions from the root portion; and a guide portion disposed in an area next to the protrusion portion opposite to the screw-fixing portion, the guide portion extending toward the one of the first and second facing portions provided with the resilient portion as it goes from the protrusion portion toward an area next to the protrusion portion opposite to the screw-fixing portion.

In the present invention, the rotation-preventing protrusion is provided in an area next to the screw-fixing portion opposite to the curved portion, and the screw-fixing portion is provided in at least one of the first and second facing portions. In addition, the rotation-preventing protrusion is provided in one of the first and second facing portions and protrudes therefrom in a direction from the one toward the other of the first and second facing portions. Therefore, according to the present invention, at the time an attachment support (a flange or the like extending from the main body of a bumper) is inserted into a space between the first and second facing portions from an area next to the space opposite to the curved portion, the end of the attachment support contacts the rotation-preventing protrusion. Consequently, at the time work for fixing the fastener of the present invention to the attachment support is performed through attaching a screw to the screw-fixing portion, even when torque occurring due to screwing of the screw acts on the fastener, the rotation-preventing protrusion can limit the fastener from rotating.

Furthermore, the attachment support has an end regardless of the shape of the attachment support. Therefore, according to the present invention, the rotation-preventing protrusion can limit the fastener from rotating without depending on the shape of the attachment support.

Thus, according to the present invention, it is possible to limit the fastener from moving relative to the attachment support during attachment work without depending on the shape or the like of the attachment support.

DETAILED DESCRIPTION

Hereinafter, an embodiment of a fastener of the present invention is described with reference to the drawings. In the following drawings, the scale of each member is appropriately changed in order to show each member in visible size.

Figure 1:
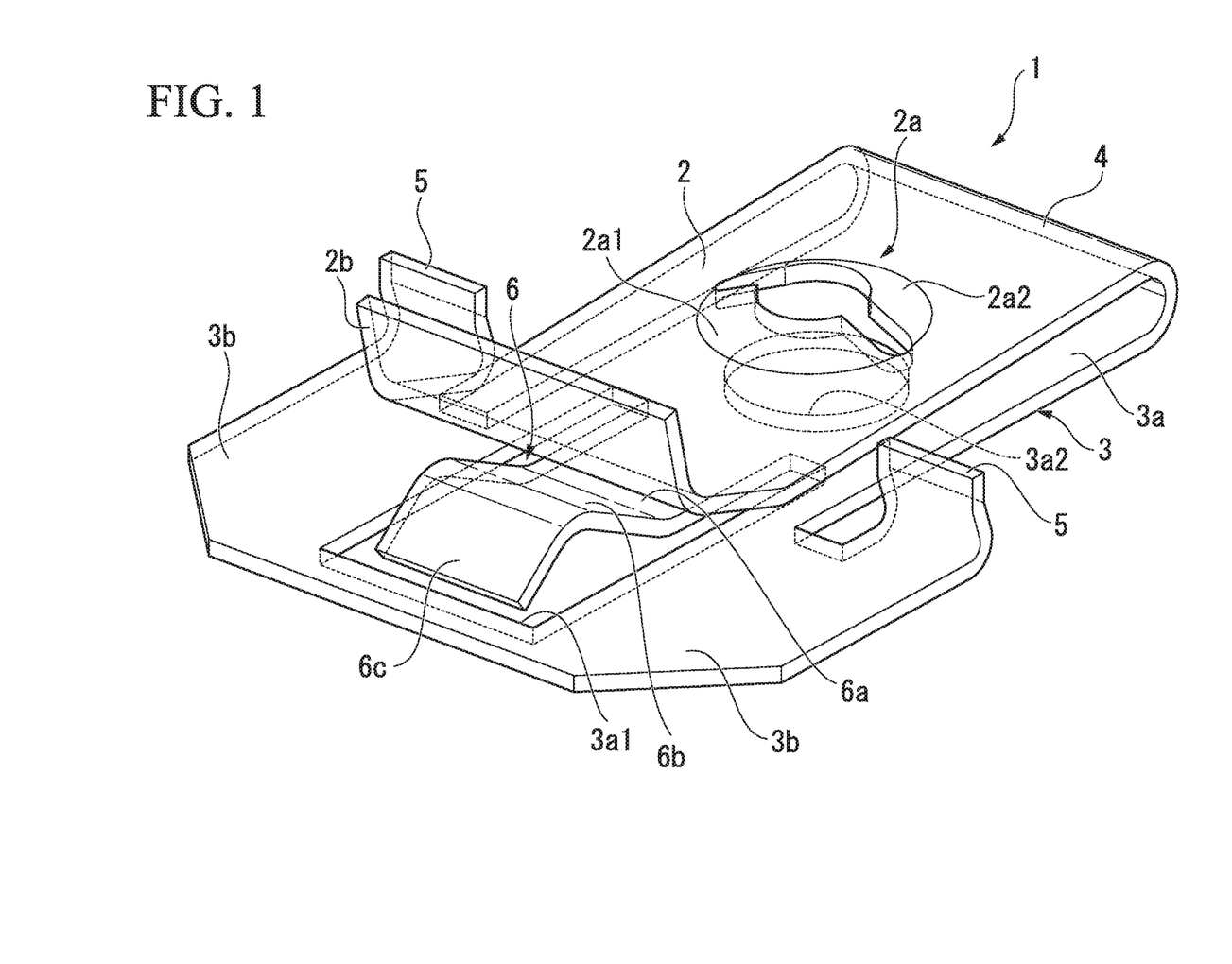
FIG. 1 is a perspective view of a fastener of an embodiment of the present invention.
Figure 2:
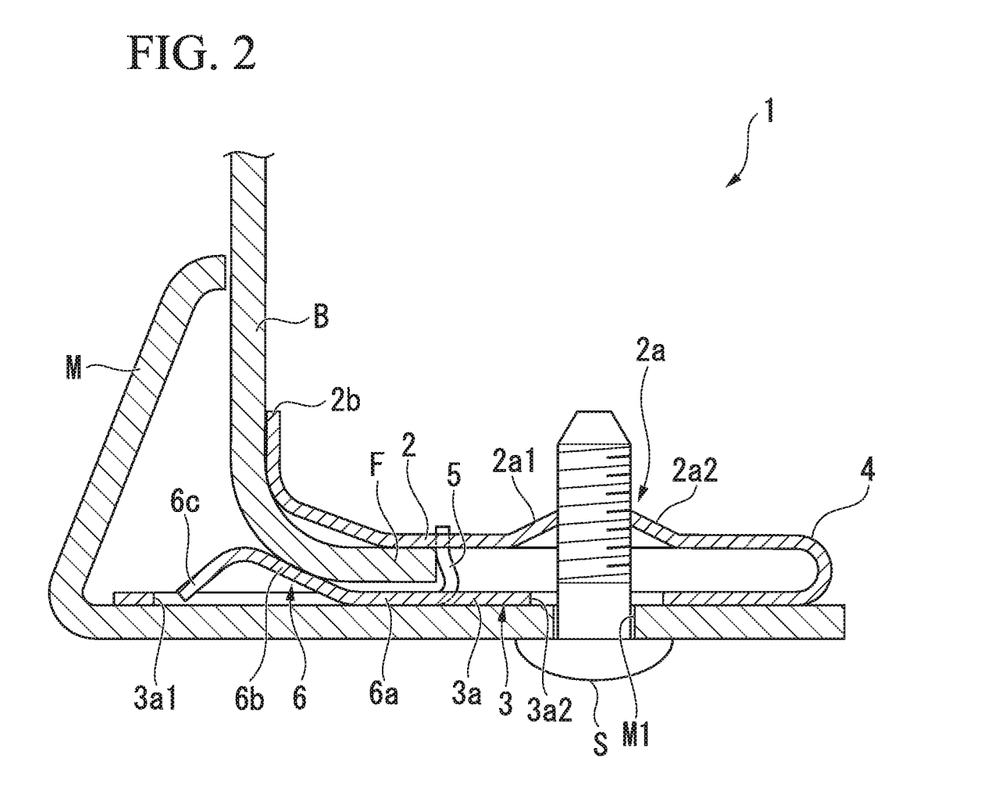
FIG. 2 is a vertical cross-sectional view including the fastener of the embodiment of the present invention.

FIG. 1 is a perspective view of a fastener 1 of this embodiment. FIG. 2 is a vertical cross-sectional view including the fastener 1 of this embodiment. As shown in FIG. 2, the fastener 1 of this embodiment is a component used for attaching a mudguard M to a flange F included in a bumper B of a vehicle. Although the attachment attitude of the fastener 1 is not particularly limited, for convenience of description, as shown in FIGS. 1 and 2, the upper side in the up-and-down direction of FIG. 2 is referred to as the upper side of the fastener 1, the lower side in the up-and-down direction of FIG. 2 is referred to as the lower side of the fastener 1, the left side in the left-and-right direction of FIG. 2 is referred to as the front side of the fastener 1, the right side in the left-and-right direction of FIG. 2 is referred to as the rear side of the fastener 1, the viewed side of the fastener 1 in FIG. 2 (the lower-right side of FIG. 1) is referred to as the left side of the fastener 1, and the opposite side to the viewed side of the fastener 1 in FIG. 2 (the upper-left side of FIG. 1) is referred to as the right side of the fastener 1.

As shown in FIG. 1, the fastener 1 of this embodiment includes an upper plate 2 (a first facing portion), a lower plate 3 (a second facing portion), a connecting portion 4 (a curved portion), rotation-preventing protrusions 5, and a resilient portion 6.

The upper plate 2 is a flat plate-shaped member, in which two surfaces thereof face upward and downward, and is disposed above the lower plate 3 by being supported by the connecting portion 4. When viewed from above, the upper plate 2 has an approximately rectangular shape, and a screw-engaging portion 2a (a screw-fixing portion) allowing a screw S (refer to FIG. 2) to be screwed thereto is provided in approximately the central part of the upper plate 2. The screw-engaging portion 2a is configured of a front arcuate plate 2a1 and a rear arcuate plate 2a2 disposed facing each other in the front-and-rear direction, and an opening into which the screw S is inserted is formed therebetween. The rear edge of the front arcuate plate 2a1 and the front edge of the rear arcuate plate 2a2 have shapes along valleys of the screw S to be screwed thereto. The front end of the upper plate 2 is erected upward, the inclination angle thereof increases to the front end, and thereby an upper guide portion 2b is formed. At the time the flange F is inserted into a space between the upper plate 2 and the lower plate 3, when the end of the flange F contacts the upper guide portion 2b, the upper guide portion 2b guides the entire fastener 1 such that the fastener 1 is lifted upward in accordance with pushing of the fastener 1.

The lower plate 3 is a flat plate-shaped member, in which two surfaces thereof face upward and downward, and is disposed below the upper plate 2. Therefore, the upper plate 2 and the lower plate 3 are disposed so as to face each other. The lower plate 3 includes a base portion 3a, in which the length thereof is greater than that of the upper plate 2 in the front-and-rear direction and the front end thereof is positioned in front of the front end of the upper plate 2, and extending portions 3b extending in the left-and-right direction from the front end of the base portion 3a. The base portion 3a is provided with a rectangular opening 3a1 at a position close to the front end of the base portion 3a, and the rectangular opening 3a1 is formed such that the resilient portion 6 is disposed thereinside when viewed from above. The resilient portion 6 is disposed inside the rectangular opening 3a1 and thereby is capable of bending in the up-and-down direction. The resilient portion 6 is disposed in an area next to the rotation-preventing protrusions 5 opposite to the screw-engaging portion 2a in a longitudinal direction described later and protrudes from the lower plate 3 toward the upper plate 2. The resilient portion 6 is provided facing the arrangement area in which the flange F is to be arranged between the upper plate 2 and the lower plate 3. The resilient portion 6 is resiliently deformable in a separation direction from the upper plate 2 toward the lower plate 3. In addition, the base portion 3a is provided with a circular opening 3a2 at a position overlapping the screw-engaging portion 2a of the upper plate 2 when viewed from above. The screw S is inserted into the circular opening 3a2.

The extending portions 3b are provided on the left and right sides of the base portion 3a. The extending portion 3b provided on the left side of the base portion 3a is provided protruding leftward from the base portion 3a, and the extending portion 3b provided on the right side of the base portion 3a is provided protruding rightward from the base portion 3a. The extending portions 3b are provided protruding in the left-and-right direction of the upper plate 2 when viewed from above.

The connecting portion 4 is a curved portion connecting part of the upper plate 2 and part of the lower plate 3. In the fastener 1 of this embodiment, the rear end (an end) of the upper plate 2 and the rear end (an end) of the lower plate 3 are connected through the connecting portion 4. The connecting portion 4 is resiliently deformable in a direction, in which the curvature radius thereof is decreased, so as to bring the upper plate 2 and the lower plate 3 close to each other. The connecting portion 4 extends along the rear ends of the upper plate 2 and the lower plate 3, that is, extends in the left-and-right direction in this embodiment, and is formed in arc shape convex rearward when viewed in the left-and-right direction.

Hereinafter, the extending direction of the connecting portion 4 may be referred to as the width direction of the upper plate 2 and the lower plate 3, and a direction orthogonal to the width direction and to the facing direction of the upper plate 2 and the lower plate 3 may be referred to as the longitudinal direction of the upper plate 2 and the lower plate 3. In this embodiment, the width direction corresponds to the left-and-right direction, and the longitudinal direction corresponds to the front-and-rear direction.

The rotation-preventing protrusions 5 are provided at the rear ends of the extending portions 3b of the lower plate 3 and protrude upward therefrom. The rotation-preventing protrusions 5 are disposed in an area in front of the screw-engaging portion 2a (namely, an area next to the screw-engaging portion 2a opposite to the connecting portion 4) and behind the front end of the upper plate 2 when viewed from above and are provided in and protrude from the lower plate 3 in a direction from the lower plate 3 toward the upper plate 2. That is, the rotation-preventing protrusions 5 are disposed in an area next to the screw-engaging portion 2a opposite to the connecting portion 4 in the longitudinal direction. The rotation-preventing protrusions 5 are disposed such that two surfaces of each of the rotation-preventing protrusions 5 face forward and rearward, and the surface of each of the rotation-preventing protrusions 5 facing forward serves as a contact surface configured to contact the flange F. In this embodiment, the rotation-preventing protrusions 5 protrude from the lower plate 3 such that the upper ends thereof are positioned above the upper plate 2.

As shown in FIGS. 1 and 2, two rotation-preventing protrusions 5 are provided in the lower plate 3. The separation distance between the rotation-preventing protrusions 5 in the left-and-right direction is greater than the width of the upper plate 2 in the left-and-right direction. That is, in the fastener 1 of this embodiment, two rotation-preventing protrusions 5 are provided so as to be separated from each other at a distance greater than the width in the left-and-right direction of the upper plate 2 not provided with the rotation-preventing protrusions 5. In addition, when viewed from above, the rotation-preventing protrusions 5 are disposed such that the upper plate 2 is interposed therebetween in the left-and-right direction. The separation distance in the left-and-right direction between the screw-engaging portion 2a and one of the rotation-preventing protrusions 5 is set to be the same as that in the left-and-right direction between the screw-engaging portion 2a and the other thereof.

When the flange F is inserted into the space between the upper plate 2 and the lower plate 3 at the time the fastener 1 is attached to the flange F, the rotation-preventing protrusions 5 contact the end surface of the flange F, whereby the positioning of the fastener 1 with respect to the flange F is performed. In addition, at the time the screw S is screwed to the screw-engaging portion 2a, the rotation-preventing protrusion 5 prevents the rotational movement of the fastener 1 caused by torque occurring due to rotating the screw S.

The resilient portion 6 includes a root portion 6a, a protrusion portion 6b, and a lower guide portion 6c (a guide portion). The resilient portion 6 is provided in the lower plate 3, and the rear end of the root portion 6a is connected to the rear edge of the rectangular opening 3a1 of the lower plate 3. The root portion 6a is a flexible portion extending forward from the connection position between the root portion 6a and the lower plate 3 and is resiliently deformable such that the front end thereof moves in the up-and-down direction. That is, the front end of the root portion 6a (the end of the root portion 6a opposite to the screw-engaging portion 2a in the longitudinal direction) is resiliently deformable in a separation direction from the upper plate 2 toward the lower plate 3.

The protrusion portion 6b is connected to the front end of the root portion 6a and is inclined upward as it goes forward. That is, the protrusion portion 6b is disposed in an area next to the root portion 6a opposite to the screw-engaging portion 2a in the longitudinal direction and extends from the front end of the root portion 6a toward the upper plate 2 and toward an area next to the root portion 6a opposite to the screw-engaging portion 2a. As shown in FIGS. 1 and 2, the front end of the protrusion portion 6b is positioned to be closer to the upper plate 2 than the lower plate 3. That is, the protrusion portion 6b protrudes from the lower plate 3 inward of the space between the upper plate 2 and the lower plate 3. In other words, the protrusion portion 6b of the resilient portion 6 protrudes from the lower plate 3 toward the upper plate 2 in the arrangement area in which the flange F is to be arranged between the upper plate 2 and the lower plate 3. The protrusion portion 6b is resiliently deformable in the separation direction from the upper plate 2 toward the lower plate 3 by being connected to the root portion 6a. When the flange F is inserted into the space between the upper plate 2 and the lower plate 3, the front end of the protrusion portion 6b contacts the flange F from below, and the protrusion portion 6b pushes the flange F toward the upper plate 2 due to the resilience of the root portion 6a. Therefore, even before the screw S is attached, the flange F can be held between the resilient portion 6 and the upper plate 2, and the fastener 1 can be prevented from dropping away from the flange F.

The lower guide portion 6c is disposed in front of the protrusion portion 6b. That is, the lower guide portion 6c is disposed in an area next to the root portion 6a opposite to the screw-engaging portion 2a. In other words, the lower guide portion 6c is disposed in an area next to the protrusion portion 6b opposite to the screw-engaging portion 2a in the longitudinal direction. The lower guide portion 6c is connected to the front end of the protrusion portion 6b. The lower guide portion 6c extends toward the lower plate 3 as it goes forward, and inclines with respect to the surface (the upper surface) of the lower plate 3. That is, the lower guide portion 6c is provided so as to extend toward the root portion 6a in a separation direction (the up-and-down direction) of the upper plate 2 and the lower plate 3 as it goes forward. In other words, the lower guide portion 6c extends toward the lower plate 3 provided with the resilient portion 6 as it goes toward an area next to the protrusion portion 6b opposite to the screw-engaging portion 2a, and in further other words, the lower guide portion 6c extends from the front end of the protrusion portion 6b (the end of the protrusion portion 6b opposite to the screw-engaging portion 2a in the longitudinal direction) toward the lower plate 3 and toward an area next to the protrusion portion 6b opposite to the screw-engaging portion 2a. At the time the flange F is inserted into the space between the upper plate 2 and the lower plate 3, when the end of the flange F contacts the lower guide portion 6c, the lower guide portion 6c guides the entire fastener 1 such that the fastener 1 is lowered downward in accordance with pushing of the fastener 1.

At the time the bumper B and the mudguard M are fastened together using the fastener 1 of this embodiment, first, the fastener 1 of this embodiment is attached to the flange F of the bumper B. In this step, a worker arranges the fastener 1 of this embodiment such that the end surface of the flange F is positioned in front of the fastener 1, and pushes the fastener 1 onto the bumper B such that the flange F is inserted into the space between the upper plate 2 and the lower plate 3. At this time, even if the position of the fastener 1 is slightly different from that of the flange F in the up-and-down direction, the fastener 1 is guided by the upper guide portion 2b or the lower guide portion 6c such that the flange F is inserted into the space between the upper plate 2 and the lower plate 3.

When the fastener 1 is pushed onto the bumper B, the end surface of the flange F contacts the surfaces of the rotation-preventing protrusions 5 facing forward. Accordingly, the positioning of the fastener 1 with respect to the flange F in the front-and-rear direction is performed. At this time, the protrusion portion 6b of the resilient portion 6 contacts and pushes the flange F form below, and the flange F is held between the resilient portion 6 and the upper plate 2. Therefore, even if the worker releases the hand thereof from the fastener 1, the fastener 1 is prevented from dropping away from the flange F.

Next, as shown in FIG. 2, the mudguard M is arranged such that the position of a screw insertion hole M1 provided in the mudguard M is equivalent to that of the circular opening 3a2 of the lower plate 3 in each of the front-and-rear direction and the left-and-right direction, and the screw S is inserted into the screw insertion hole M1 and the circular opening 3a2 from below and is screwed to the screw-engaging portion 2a. In addition, the type of the screw S attached to the fastener 1 is not particularly limited. A machine screw, a bolt, a tapping screw or the like can be used for the screw S. When the screw S is rotated so as to be tightened, the upper plate 2 and the lower plate 3 are brought close to each other, and the flange F is firmly held between the upper plate 2 and the lower plate 3. Therefore, the fastener 1 is fixed to the flange F. In addition, the mudguard M is held between the head of the screw S and the lower plate 3 of the fastener 1, and the fastener 1 and the mudguard M are firmly fixed to each other. Consequently, the mudguard M is fastened on the bumper B through the fastener 1.

In the fastener 1 of this embodiment as described above, the rotation-preventing protrusions 5 are provided in an area in front of the screw-engaging portion 2a provided in the upper plate 2. In addition, the rotation-preventing protrusions 5 are provided in the lower plate 3 and protrude therefrom in a direction from the lower plate 3 toward the upper plate 2. Therefore, according to the fastener 1 of this embodiment, at the time the flange F is inserted into the space between the upper plate 2 and the lower plate 3 from a front side of the space, the end surface of the flange F contacts the rotation-preventing protrusions 5. Consequently, at the time work for fixing the fastener 1 to the flange F is performed through attaching the screw S to the screw-engaging portion 2a, even when torque occurring due to screwing of the screw S acts on the fastener 1, the rotation-preventing protrusion 5 can limit the rotation of the fastener 1.

Furthermore, the flange F has an end regardless of the shape of the flange F. Therefore, according to the fastener 1 of this embodiment, the rotation-preventing protrusion 5 can limit the fastener 1 from rotating without depending on the shape of the flange F.

Thus, according to the fastener 1 of this embodiment, it is possible to limit the fastener 1 from moving during attachment work without depending on the shape or the like of an attachment support such as the bumper B, and to easily and reliably fix an attachment component (the mudguard M) to the attachment support (the bumper B).

In the fastener 1 of this embodiment, two rotation-preventing protrusions 5 are provided in the lower plate 3 so as to be separated from each other at a distance greater than the width of the upper plate 2 in the left-and-right direction. Since a plurality of rotation-preventing protrusions 5 are provided therein, the positioning of the fastener 1 with respect to the flange F can be stably performed. In addition, since two rotation-preventing protrusions 5 are separated at a distance greater than the width of the upper plate 2 in the left-and-right direction and are far away from each other, the rotation-preventing protrusions 5 can be disposed at distant positions from the rotation center (the screw-engaging portion 2a), and a force that each rotation-preventing protrusion 5 receives at the time a moment occurs due to screwing of the screw S can be decreased. Therefore, a load added to the rotation-preventing protrusion 5 can be reduced. In addition, in the fastener 1 of this embodiment, since two rotation-preventing protrusions 5 are provided such that the screw-engaging portion 2a is interposed therebetween in the left-and-right direction, it is possible to prevent the rotation of the fastener 1 relative to the flange F during each of tightening and loosening of the screw S.

In the fastener 1 of this embodiment, the lower plate 3 is provided with the resilient portion 6 resiliently deformable in the up-and-down direction. Accordingly, the flange F can be held between the resilient portion 6 and the upper plate 2, and even before the screw S is attached, the fastener 1 is prevented from dropping away from the flange F.

In the fastener 1 of this embodiment, the resilient portion 6 includes the root portion 6a resiliently deformable in the up-and-down direction, the protrusion portion 6b disposed in front of the root portion 6a and protruding upward relative to the root portion 6a, and the lower guide portion 6c disposed in front of the protrusion portion 6b and extending downward as it goes forward. Accordingly, the flange F can be easily inserted into the space between the upper plate 2 and the lower plate 3 because of the lower guide portion 6c and can be prevented from catching on the resilient portion 6.

Hereinbefore, although the embodiment of the present invention has been described with reference to the attached drawings, the present invention is not limited to the above embodiment. The shape, the combination or the like of each component shown in the above embodiment is an example, and various modifications of a configuration based on a design request or the like can be adopted within the scope of the present invention.

Figure 3:
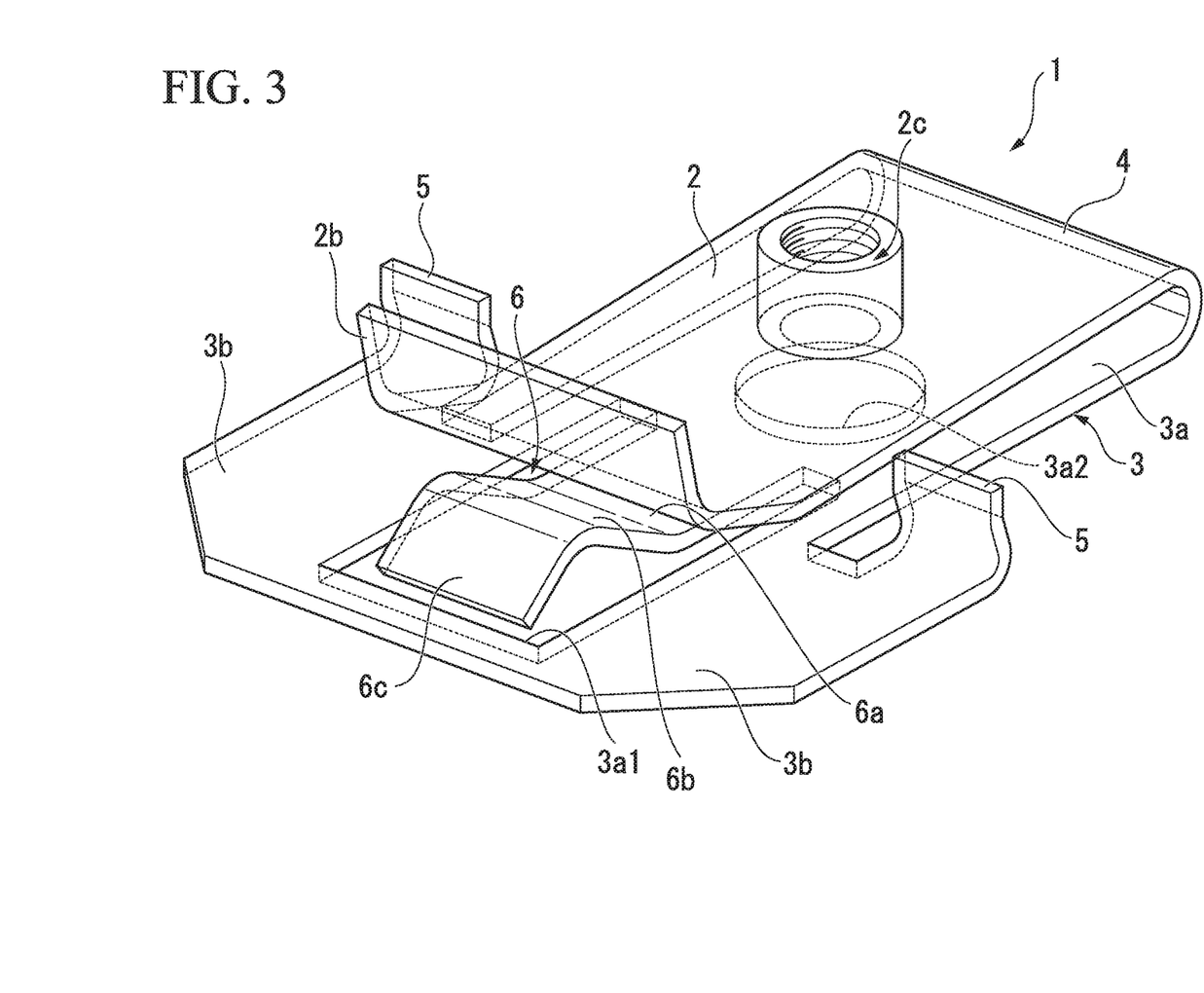
FIG. 3 is a perspective view showing a modification of the fastener of the embodiment of the present invention.
Figure 4:
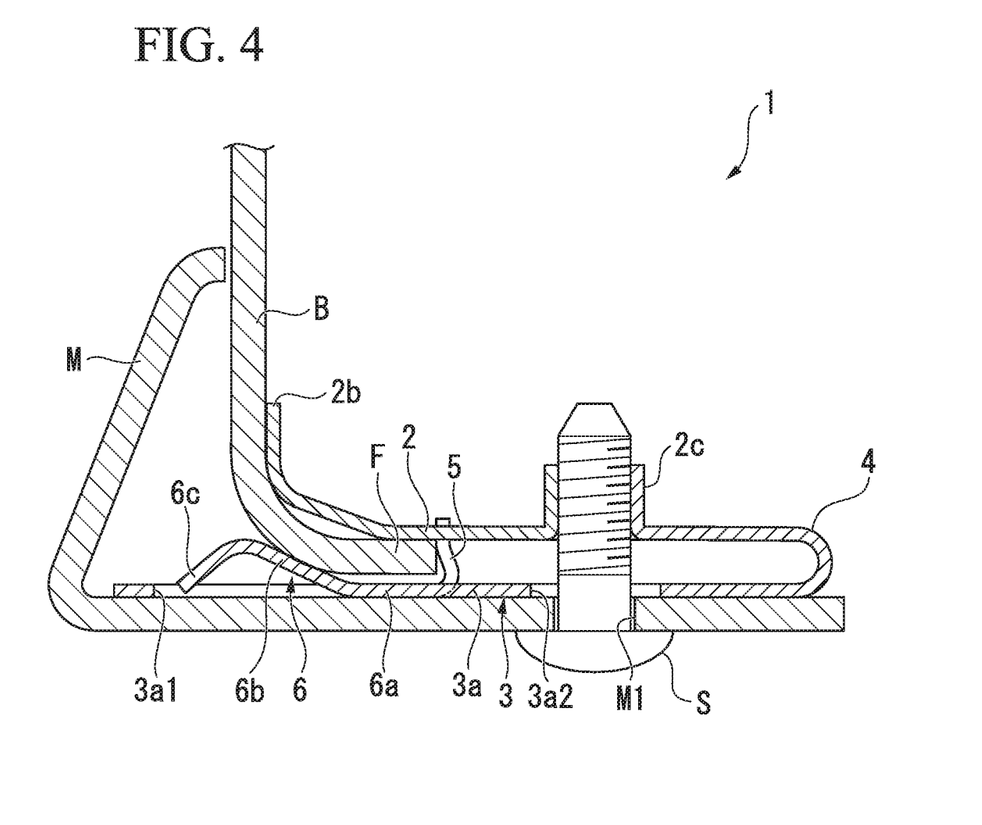
FIG. 4 is a vertical cross-sectional view showing the modification of the fastener of the embodiment of the present invention.

FIGS. 3 and 4 show a modification of the fastener 1 of the above embodiment. FIG. 3 is a perspective view of a fastener 1 of this modification. FIG. 4 is a vertical cross-sectional view including the fastener 1 of this modification. As shown in these drawings, a cylindrical screw-engaging portion 2c may be provided instead of the screw-engaging portion 2a of the fastener 1 of the above embodiment. The inner circumferential surface of the screw-engaging portion 2c is provided with female thread. The screw-engaging portion 2c may be provided in the upper plate 2 through press working or the like or may be connected to the upper plate 2 through welding or the like.

In the above embodiment, a configuration in which the lower plate 3 is provided with the rotation-preventing protrusion 5 is described. However, the present invention is not limited thereto, and the upper plate 2 may be provided with the rotation-preventing protrusion 5 protruding downward.

In the above embodiment, the rotation-preventing protrusion 5 is connected to the extending portion 3b of the lower plate 3 and is disposed in a position different from the upper plate 2 when viewed from above. However, as long as the rotation of the fastener 1 during screwing can be limited, the rotation-preventing protrusion 5 may be disposed between the upper plate 2 and the lower plate 3, and that is, may be disposed in the same position as the upper plate 2 when viewed from above.

In the above embodiment, the rotation-preventing protrusion 5 protrudes from the lower plate 3 such that the upper end of the rotation-preventing protrusion 5 is positioned above the upper plate 2. However, the upper end of the rotation-preventing protrusion 5 may be disposed at a position having the same height as that of the upper plate 2 or as another position between the upper plate 2 and the lower plate 3 in the up-and-down direction (the facing direction of the upper plate 2 and the lower plate 3).

In the above embodiment, a configuration in which the upper plate 2 is provided with the screw-engaging portion 2a or 2c is described. However, the present invention is not limited thereto, and a configuration may be adopted in which a screw-engaging portion is provided in each of the upper plate 2 and the lower plate 3 or only in the lower plate 3.

In the above embodiment, a configuration in which the resilient portion 6 is provided in the lower plate 3 is described. However, the present invention is not limited thereto, and a configuration may be adopted in which a resilient portion is provided in each of the upper plate 2 and the lower plate 3 or only in the upper plate 2.

In the above embodiment, a configuration in which the fastener 1 is used for fastening the bumper B and the mudguard M together is described. However, the present invention is not limited thereto. The fastener of the present invention may be used for fastening other components together of a vehicle.

In the above embodiment, a configuration in which two rotation-preventing protrusions 5 are provided is described. However, the present invention is not limited thereto, and a configuration can be adopted in which only one rotation-preventing protrusion 5 is provided. In this case, it is preferable that the rotation-preventing protrusion 5 be disposed at a position capable of limiting the rotation of the fastener 1 at least at the time the screw S is tightened.

The invention claimed is:

1. A fastener, comprising:
a first facing portion and a second facing portion disposed so as to face each other, ends of the first and second facing portions being connected through a curved portion;
a screw-fixing portion provided in at least one of the first and second facing portions and allowing a screw to be fixed thereto; and
a rotation-preventing protrusion provided in one of the first and second facing portions and protruding therefrom in a direction from the one toward the other of the first and second facing portions,
wherein, with respect to the curved portion, the rotation-preventing protrusion is disposed farther than the screw-fixing portion, and
wherein rotation-preventing protrusions are provided so as to be separated from each other at a distance greater than a width of the other of the first and second facing portions not provided with the rotation-preventing protrusions.

2. The fastener, according to claim 1, comprising:
a resilient portion provided in at least one of the first and second facing portions and being resiliently deformable in a separation direction from the other toward the one of the first and second facing portions,
wherein, with respect to the curved portion, the resilient portion is disposed farther than the screw-fixing portion.

3. The fastener, according to claim 2, wherein the resilient portion includes:
a root portion resiliently deformable in the separation direction;
a protrusion portion protruding inward in a space between the first and second facing portions from the root portion, wherein, with respect to the screw-fixing portion, the protrusion portion is disposed farther than the root portion; and
a guide portion extending toward the one of the first and second facing portions, the guide portion extending from the protrusion portion in a direction away from the screw-fixing portion wherein, with respect to the screw-fixing portion, the guide portion is disposed farther than the protrusion portion.

4. The fastener, according to claim 3, wherein the other of the first and second facing portions not provided with the rotation-preventing protrusion includes a second guide portion facing the guide portion.

5. A fastener, comprising:
a first facing portion and a second facing portion disposed so as to face each other, ends of the first and second facing portions being connected through a curved portion;
a screw-fixing portion provided in at least one of the first and second facing portions and allowing a screw to be fixed thereto;
a rotation-preventing protrusion provided in one of the first and second facing portions and protruding therefrom in a direction from the one toward the other of the first and second facing portions,
wherein, with respect to the curved portion, the rotation-preventing protrusion is disposed farther than the screw-fixing portion; and
a resilient portion provided in at least one of the first and second facing portions and being resiliently deformable in a separation direction from the other toward the one of the first and second facing portions,
wherein, with respect to the curved portion, the resilient portion is disposed farther than the screw-fixing portion.

6. The fastener, according to claim 5, wherein the resilient portion includes:
a root portion resiliently deformable in the separation direction;
a protrusion portion protruding inward in a space between the first and second facing portions from the root portion, wherein, with respect to the screw-fixing portion, the protrusion portion is disposed farther than the root portion; and
a guide portion extending toward the one of the first and second facing portions, the guide portion extending from the protrusion portion in a direction away from the screw-fixing portion wherein, with respect to the screw-fixing portion, the guide portion is disposed farther than the protrusion portion.

7. The fastener, according to claim 6, wherein the other of the first and second facing portions not provided with the rotation-preventing protrusion includes a second guide portion facing the guide portion.

8. A fastener, comprising:
a first facing portion and a second facing portion disposed so as to face each other, ends of the first and second facing portions being connected through a curved portion;
a screw-fixing portion provided in at least one of the first and second facing portions and allowing a screw to be fixed thereto; and
a rotation-preventing protrusion provided in one of the first and second facing portions and protruding therefrom in a direction from the one toward the other of the first and second facing portions, wherein, with respect to the curved portion, the rotation-preventing protrusion is disposed farther than the screw-fixing portion, and wherein the rotation-preventing protrusion protrudes from the one of the first and second facing portions and reaches the other of the first and second facing portions when viewed in a direction in which the ends extend.

\* \* \* \* \*